(Model.)
C. J. VAN DEPOELE.
MOTOR FOR ELECTRIC REGULATORS.
No. 294,165.  Patented Feb. 26, 1884.
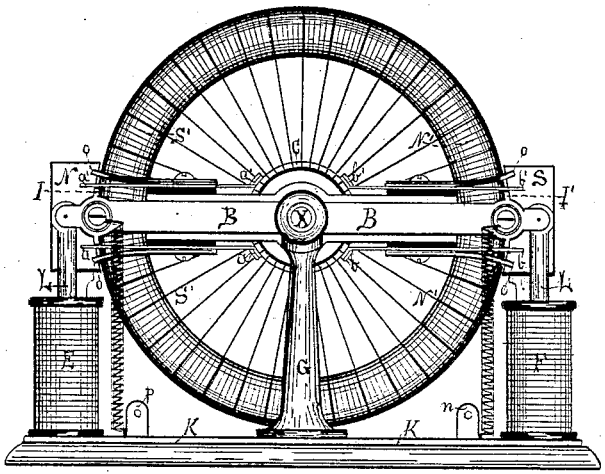
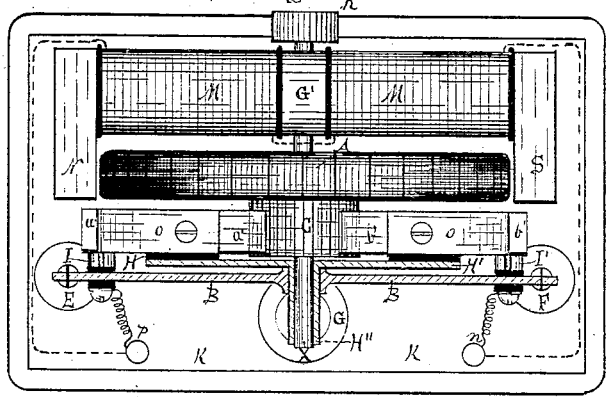
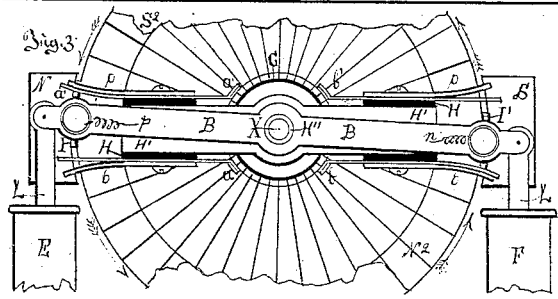
Witnesses:
Norman T Gassette
Theo. P. Bailey
Inventor
Charles J. Van Depoele

United States Patent Office.

CHARLES J. VAN DEPOELE, OF CHICAGO, ILLINOIS.

MOTOR FOR ELECTRIC REGULATORS.

SPECIFICATION forming part of Letters Patent No. 294,165, dated February 26, 1884.

Application filed June 14, 1883. (Model.)

*To all whom it may concern:*

Be it known that I, CHARLES J. VAN DEPOELE, of Chicago, in the county of Cook and State of Illinois, have invented new and useful Improvements in Motors for Electric Regulators; and I hereby declare that the following is a full, clear, and exact description thereof, reference being had to the accompanying drawings, which form a part of this specification.

My invention relates to a new and useful device to be used in connection with electric lighting or other purposes where electricity is the active agent; and it consists of an arrangement by which motion can be imparted either right or left, as desired, in a circular armature properly disposed between the poles of a magnet or electro-magnet. The device can be used to operate the feed of the carbons in an electric-arc lamp, or it can be used to operate the adjustment of brushes of a dynamo-electric machine. The same can be made as a motor where it is desirable to reverse the motion rapidly or to keep the motor fast, so as to prevent the same from turning either way, and thus to accomplish the results which may be demanded from said motor.

The following is a specification of my invention, reference being had to the annexed drawings, forming part of this specification.

In Figure 1, A is a circular armature, mounted on a shaft, X, and provided with a commutator, C. $a\ a'$ and $b\ b'$ are four contact-brushes, pressing upon C on the opposite end from where the brushes bear upon the commutator. The same are made elastic and bear upon movable contacts I and I'. B B is an oscillating beam carrying the contacts I I', and by moving the same down either to the right or left contact is broken with an opposite pair of brushes, thus when a current is passing the polarity in A can be shifted either under or above the pole-pieces S and N, and thus make A revolve either to the right or the left, as the case may be. When B B is kept, as shown in Fig. 1, A is kept fast and prevented from turning, its polarity corresponding exactly to the center of attraction in N and S. C is a commutator. E and F are two electro-magnets or solenoids intended to operate B B by drawing in their cores L L, which are articulated to beam B B. I and I' are two insulated contact-pieces intended to establish the current through brushes $a\ a'$ and $b\ b'$ in armature A. N and S are the polar extensions of electro-magnet M M. (Shown in Fig. 2.) $p$ and $n$ are the positive and negative terminals of the circuit through the device. G is a post supporting the armature-shaft X, &c.; K K, base of device.

Fig. 2 is a view on top of the device, and at the same time a plan of the same. A, armature; B B, oscillating beam; C, commutator. E and F are two electro-magnets or solenoids. G is a post supporting armature A by shaft X. H' is a cross-bar provided with insulating-pieces H, to which the brushes $a\ a'$ and $b\ b'$ are secured. H'' is a hub supporting H', and is fitted in G and allows X to move freely inside of it and B B outside of it or around said hub. I I' are two contact-pieces insulated from B B. O O are four pieces of brass, forming guides or supports to the brushes $a\ a'$ and $b\ b'$, intended to limit the stroke or oscillations of B B. $p$ and $n$ are the positive and negative terminals of the device; M M, electro-magnet; N and S, polar extensions to M M; G', section of iron in M M, serving at the same time as a bearing for shaft X; R, pinion or pulley from which the motion of the armature A can be communicated to any outside arrangement; K K, base of device.

Fig. 3 shows beam B B dipping down toward F, when the armature A will be caused to revolve in the direction indicated by the arrows, the same letters and figures corresponding with Figs. 1 and 2.

Having described the different parts of my invention, I will proceed to explain the same while in operation.

As seen in Fig. 2, the current enters at $p$, passing to M M by proper conductor, as indicated by dotted lines, and back to $n$, and to armature from $p$ to I by spiral conductor $p$, from I to brushes $a$ and $a'$, to commutator C, to armature-coils coming out on opposite side by brushes $b$ and $b'$ to I', and back to $n$ by spiral conductor $n$. On establishing the current by means of posts $p$ and $n$ from some source of electricity, the polarity will be in the armature with regard to N and S, as shown in Fig. 1, S' and S' in front of N, while on the opposite side N' and N' will be in front of S, so that the effect of the poles N and S will be to keep A stationary as long as the current is passing, as indicated in Fig. 1. However, as soon as the beam B B is dipped either to the right or to the left the contact with two opposite brushes will be broken, while the two other brushes will be pressed upon the plates O O. Thus, the point of attraction between the stationary poles and revolving armature being altered, A will begin to revolve. The points in the armature corresponding to the sections in the commutator where the current is entering and leaving will be attracted toward the stationary poles N and S. As shown in Fig. 3, B is dipped toward F. I' is in contact with brush $b$, while on the opposite side I is in contact with $a'$, while contact is broken with $b'$ and $a$ as long as the current is passing, and B B, in the position as shown in Fig. 3, will revolve A, as indicated by the arrows; but as soon as B B is again brought in the position as shown in Fig. 1, then A will be kept stationary, and on B B dipping toward E, A will revolve in the opposite direction from that shown in Fig. 3.

The device can be applied to run elevators or any other work where it is necessary to instantly reverse the power or the motion. In case of an elevator, the beam B B is dipped by suitable means either to the right or left, when it is necessary to run either up or down. For adjusting the brushes in a dynamo, the main current of a dynamo is made to circulate through E, and F can be replaced by a spring or some other device. By the disposition of the brushes and their contacts I and I', the current can be shifted from one set to the other without producing any spark, and without breaking the circuit, since one pair of diametrically-opposite brushes cannot break contact before the other pair are in circuit.

What I claim as new, and desire to secure by Letters Patent in the United States, is—

1. A motor for electric regulators, consisting of a stationary electro-magnet and a revolving armature disposed between the opposite poles of said electro-magnet, in combination with a commutator and four brushes constantly in contact with said commutator, and means for allowing the current to pass through all four of the brushes, as shown, so as to prevent the armature from revolving or moving either way, as above described and set forth.

2. In a motor for electric regulators, a stationary electro-magnet, and a revolving armature put in proper relation with each other's poles, in combination with a commutator to said revolving armature, upon which four brushes are constantly pressing, and proper means to put a diametrically-opposite pair of said brushes out of circuit, in order to make the armature in the device to rotate either to the right or to the left, according to the position of the pair of brushes remaining in circuit, with regard to the stationary poles of the electro-magnet, substantially as described.

3. In a motor for electric regulators, a revolving armature placed between the poles of a stationary electro-magnet, the commutator to said armature provided with four contact-brushes constantly pressing upon said commutator, in combination with two insulated contacts borne by an oscillating beam, which will keep all four of the brushes in circuit when the apparatus is to be kept stationary, but which on the oscillating of said beam will cut out of circuit one pair of diametrically-opposite brushes, while the other pair remain in circuit, so as to produce the motion in said armature from its highest point of attraction toward the stationary poles of its field-magnet, as above shown and described.

4. A motor for electric regulators, consisting of an electro-magnet, M M, having its poles N and S, between which a circular armature, A, is placed capable of revolving on its center, either to the right or the left, by the action of an electric current directed by brushes $a$ $a'$ and $b$ $b'$, all bearing upon a commutator, C, and an oscillating beam, B B, carrying insulated contacts I and I' in connection with the brushes, and so disposed as to allow the current to circulate through four brushes at the same time, and by locating the centers of attraction in the revolving armature at points opposite the centers of attraction in its field-magnet to keep the said armature stationary, but when it is desired to revolve A either to the right or the left, I and I', to break contact with either pair of diametrically-opposite brushes, and thereby displacing the polarity in the revolving armature with regard to the stationary poles N and S, and producing motion in A corresponding to the two brushes left in circuit, as set forth.

5. In a motor for electric regulators, a revolving armature and its commutator, in combination with four brushes constantly in contact with said commutator and on opposite sides of the latter, and a means for cutting either out or in circuit a pair of diametrically-opposite brushes, in order to alter the position of polarity in the revolving armature with regard to two stationary magnetic points, and so to produce motion in said armature in such direction as determined by the action of the current through the brushes left in circuit.

6. In a motor for electric regulators having a stationary field-magnet and rotating armature, the commutator whereof is provided with two pairs of opposing or oppositely-placed contact-brushes, an oscillating contact-breaking device capable of making contact with all the brushes at once, and means, substantially as described, whereby the same is adapted to break contact with either pair of opposing brushes without breaking the main circuit, as set forth.

CHARLES J. VAN DEPOELE.

Witnesses:
 THEO. P. BAILEY,
 N. J. GASSETTE.